United States Patent Office 3,386,977
Patented June 4, 1968

3,386,977
COPOLYMERS OF PERFLUOROALKYL
α-TRIFLUOROMETHACRYLATES
Eduard K. Kleiner, New York, N.Y., assignor to Geigy Chemical Corporation, Greenburgh, N.Y., a corporation of Delaware
No Drawing. Filed Aug. 13, 1965, Ser. No. 479,644
2 Claims. (Cl. 260—86.1)

This invention relates to fluorine-containing copolymers with useful soil repellent properties. More particularly, it relates to copolymers of 1,1-dihydroperfluoroalkyl α-trifluoromethacrylates. The new copolymers have oil- and water-repellent properties and are useful as finishes for materials such as textiles, paper, leather, painted wooden and metallic surfaces, and the like.

The new compounds contemplated by the present invention are, in essence: copolymers of compounds of the formula:

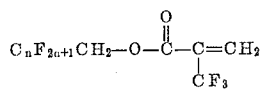

wherein $n$ is a whole number of from 3 to 17, and comonomers which contain an ethylenic linkage. The $C_nF_{2n+1}$ radical may be straight or branched chain.

Illustrative of the said comonomers which contain an ethylenic linkage are ethylene, vinyl acetate, vinyl chloride, vinyl fluoride, vinylidene, chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloro acrylic acid and alkyl esters thereof, methacrylonitrile, acrylamide, methacrylamide, vinyl carbazole, vinyl pyrrolidone, vinyl pyridine, vinyl alkyl ethers, vinyl alkyl ketones, butadiene, fluorinated butadienes, chloroprene, fluoroprene, isoprene, and the like.

An embodiment of the instant invention especially useful to form soil-repellent finishes is a copolymer of 1,1-dihydroperfluorooctyl α-trifluoromethacrylate and n-octyl methacrylate.

The perfluorinated compounds useful to prepare the new copolymers are prepared from readily available materials according to the reaction outlined in the following sequence:

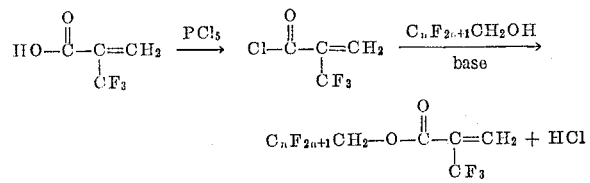

wherein $n$ is as above defined. The term "base" contemplates a reagent which promotes condensation by binding the elements of hydrogen chloride eliminated as a byproduct. Quinoline is an especially useful base. The starting materials to make the monomers are readily available or can be prepared by techniques readily within the capabilities of those skilled in the art. α-Trifluoromethylacrylic acid, for example, can be prepared by the procedure of Buxton, Stacey and Tatlow, J. Chem. Soc. 1954, 366. 1,1-dihydroperfluoroalcohols of the formula

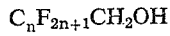

can be obtained, for example, by the procedures described in Husted et al., U.S. 2,666,797. As will be more fully exemplified hereinafter, the 1,1-dihydroperfluoroalkyl α-trifluoromethacrylates are conveniently prepared by treating α-trifluoromethacrylic acid with a slight molar excess of phosphorus pentachloride. The reaction mixture, after a slight temperature increase subsides, is allowed to stand for about 16 hours. The residue is purified by distillation to afford α-trifluoromethacrylyl chloride. This is converted to the 1,1-dihydroperfluoroalkyl esterified monomers by adding it to a stirred mixture of equimolar amounts of the appropriate 1,1-dihydroperfluoroalkanol and quinoline in about one-fourth volume of acetonitrile, based on the reaction volume. The reaction temperature preferably is maintained below about 60° and the quinoline hydrochloride usually precipitates. The product can be recovered, for example, by adding several volumes of water and then extracting it into ether, and separating the ether, the product remaining as a residue after evaporation of the ether. The product can be purified, for example, by distillation, preferably in a vacuum. Polymerization during distillation can be inhibited by adding a small amount of hydroquinone.

The instant copolymers are formed by standard procedures well known to those skilled in the art. Copolymerization occurs readily by bulk, solution or emulsion techniques, employing free radical-forming catalysts. The ratios of percentages by weight of the respective monomers used is not particularly critical in the formation of useful copolymers. For example, charge ratios of the 1,1-dihydroperfluoroalkyl α-trifluoromethacrylate monomers may vary from 1 to 99% by weight of the total monomer mixture. It is preferred however, for the best balance of economy and ultimate properties, to use somewhat less than 50% by weight of the perfluorinated α-trifluoromethacrylate monomers based on the total monomer mixture. It is noted in this connection that the optimum repellency level is usually reached with less than 25% by weight of fluorine present in the polymer system.

The copolymers broadly contemplated can have at least three structural variations: they can be homogeneous copolymers; or they can exist in the form of segmented (or heterogeneous) copolymers; or they can comprise physical blends of trifluoromethacrylate homopolymers or copolymers blended with a non-fluorine containing homo- or copolymer. The term "copolymer" used herein broadly contemplates these above-mentioned variations, as well as all copolymers of 1,1-dihydroperfluoroalkyl α-trifluoromethacrylate obvious to those skilled in the art. Exemplification for the preparation of homogeneous copolymers is given hereinafter. Suitable techniques applicable to the preparation of segmented or heterogenous copolymers within the scope of this invention are exemplified in U.S. 3,068,187. The preparation of copolymer blends within the scope of this invention can be achieved employing appropriate monomers and the detailed descriptions in Belgian Patents Nos. 635,437 and 645,697. In some instances copolymers with superior repellencies are obtained as the result of application of the latter two techniques.

In general all polymerization techniques and procedures for kind and amount of catalyst, emulsifiers, chain regulators, solvents, and the like are well within the capabilities of those skilled in the art to which this invention pertains.

Films of the copolymers can be prepared by casting from solvent solutions. Especially useful as solvents are fluorinated liquids, and special mention is made of α,α,α-trifluorotoluene, also known as benzotrifluoride.

As a demonstration of the substantial hydrophobic and oleophobic properties of the new copolymers, mention is made of the finding that a smooth film of the bulk copolymer of 36.5% by weight of 1,1-dihydroperfluorooctyl α-trifluoromethacrylate and 63.5% by weight of n-octyl methacrylate had a surface energy of 15 dynes/cm.

This particular copolymer, when dissolved in benzotrifluoride and applied to cotton and wool at a level of 2% by weight of polymer based on the fabric had a repellency rating in the 3M oil test of 140, which is very high. At the same level on cotton in the AATCC–H$_2$O– Test the copolymer had a rating of 70.

Similarly other copolymers within the scope of this invention also provide films with strongly hydrophobic and oleophobic properties.

The following examples are illustrative of the compounds of the instant invention. They are provided for purposes of exemplification and are not to be construed to limit the scope of the claims in any manner.

Example I.—1,1-dihydroperfluorooctyl α-trifluoromethacrylate

To a 500 ml. 3-necked flask containing 98.1 parts (0.70 mole) of α-trifluoromethacrylic acid (Buxton, Stacey and Tatlow, J. Chem. Soc., 1954, 366) is added in small increments with stirring 156 parts (0.75 mole) of phosphorous pentachloride. The reaction is exothermic to 45° C. After being allowed to stand overnight under a slow stream of nitrogen, the reaction mixture is filtered, then distilled at atmospheric pressure. The fraction boiling at 90–103° C. is redistilled through a spinning band column affording 53.5 parts of α-trifluoromethacrylyl chloride, B.P. 91° C.

To a stirred solution of 126.2 parts (0.315 mole) of 1,1-dihydroperfluorooctanol and 40.7 parts (0.315 mole) of quinoline in 50 parts by volume of acetonitrile is added dropwise in about 5 minutes 50.0 parts of α-trifluoromethacrylyl chloride. The temperature is not allowed to exceed 60° C. Stirring is continued without cooling until precipitation occurs after which the reaction mixture is allowed to stand overnight. The mixture then is poured into water, the product is extracted into ether, the ether is dried and then evaporated. The residue is inhibited with a small amount of hydroquinone and distilled at 20 microns pressure and 55–7° C. The yield is 81.2 parts.

Example II

By the procedure of Example I, substituting stoichiometrically equivalent amounts of appropriate 1,1-dihydroperfluoroalkanols for 1,1 - dihydroperfluorooctanol, there are obtained the following new 1,1-dihydroperfluoroalkyl α-trifluoromethacrylates:

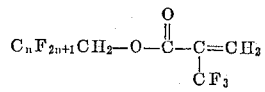

| $C_nF_{2n+1}CH_2$: | $n$ |
|---|---|
| $CF_3CF_2CF_2CH_2$ | 3 |
| $(CF_3)_2CF \cdot CH_2$ | 3 |
| $CF_3(CF_2)_{16}CH_2$ | 17 |
| $CF_3(CF_2)_{10}CH_2$ | 11 |
| $CF_3(CF_2)_4CH_2$ | 5 |

Example III

A bulk copolymer of 1,1-dihydroperfluorooctyl α-trifluoromethacrylate is prepared by heating 50 parts by weight of the monomer of Example I and 50 parts by weight of n-octyl methacrylate with 2% by weight of azodiisobutyrodinitrile in an evacuated, sealed ampul for 18 hours at 80° C. The resulting copolymer is dissolved in benzotrifluoride, precipitated with methanol, dried and analyzed. It has a composition of 36.5% by weight of the 1,1 - dihydroperfluoroalkyl α - trifluoromethacrylate and 63.5% by weight of n-octylmethacrylate. It has a second order transition temperature of 0° C. The free surface energy of a film is 15 dynes/cm. (determined with aqueous solutions of dioctyl-sodium sulfosuccinate).

Example IV

Copolymers with soil repellent properties are obtained by copolymerizing the new monomers of Example II with n-octyl methacrylate under the conditions of Example III.

Example V

Copolymers with soil repellent properties are obtained by emulsion polymerization using an ammonium persulfate catalyst and 1,1-dihydroperfluorooctyl α-trifluoromethacrylate, with equal parts by weight based on the said methacrylate, of comonomers:

| | |
|---|---|
| Ethylene | Methyl methacrylate |
| Vinyl acetate | α-Chloroacrylic acid |
| Vinyl chloride | Methacrylonitrile |
| Vinyl fluoride | Acrylamide |
| Vinylidene chloride | Methacrylamide |
| Vinylidene fluoride | Vinyl carbazole |
| Vinyl chloroacetate | Vinyl pyrrolidone |
| Acrylonitrile | Vinyl pyridine |
| Vinylidene cyanide | Methyl vinyl ether |
| Styrene | Methyl vinyl ketone |
| Vinyl toluene | Butadiene |
| Vinyl benzenesulfonic acid | Chloroprene |
| p-Chlorostyrene | Fluoroprene, and |
| Methyl acrylate | Isoprene |

What is claimed is:
1. Copolymers of compounds of the formula:

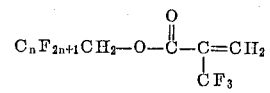

wherein $n$ is a whole number of from 3 to 17, and comonomers which contain an ethylenic linkage.

2. A copolymer of 1,1-dihydroperfluorooctyl α-trifluoromethacrylate and n-octyl methacrylate.

No References Cited.

JOSEPH L. SCHOFER, *Primary Examiner.*

H. WONG, JR., *Assistant Examiner.*